United States Patent
Strutt

(10) Patent No.: US 10,190,712 B2
(45) Date of Patent: Jan. 29, 2019

(54) SLIDING DUCT CONNECTION

(71) Applicant: WESTINGHOUSE ELECTRIC COMPANY LLC, Cranberry Township, PA (US)

(72) Inventor: David Strutt, Beaver Falls, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 765 days.

(21) Appl. No.: 13/632,188

(22) Filed: Oct. 1, 2012

(65) Prior Publication Data

US 2014/0091570 A1  Apr. 3, 2014

(51) Int. Cl.
| F16L 37/26 | (2006.01) |
| F16L 27/12 | (2006.01) |
| F16L 25/00 | (2006.01) |
| G21C 13/032 | (2006.01) |

(52) U.S. Cl.
CPC ........... *F16L 37/26* (2013.01); *F16L 25/0036* (2013.01); *F16L 27/125* (2013.01); *G21C 13/032* (2013.01)

(58) Field of Classification Search
CPC ......... F16L 37/26; F16L 27/02; F16L 27/026; F16L 27/125
USPC ............................... 285/67, 27, 29, 325, 424
See application file for complete search history.

(56) References Cited

U.S. PATENT DOCUMENTS

| 348,556 | A | * | 9/1886 | Grueninger ..................... 285/67 |
| 749,496 | A | | 1/1904 | Patterson et al. |
| 760,424 | A | * | 5/1904 | Churchill ......................... 285/67 |
| 2,933,334 | A | * | 4/1960 | De Moude ..................... 285/110 |
| 3,260,539 | A | | 7/1966 | Herron |
| 3,304,104 | A | * | 2/1967 | Wiltse .............................. 285/5 |
| 3,365,215 | A | | 1/1968 | Arzt et al. |
| 4,097,072 | A | * | 6/1978 | van Heijst ............... F16L 27/02 285/114 |
| 5,788,291 | A | * | 8/1998 | Williams et al. ............. 285/325 |
| 5,970,623 | A | * | 10/1999 | Tuggle .................... D06F 58/20 34/134 |
| 6,195,910 | B1 | * | 3/2001 | Robineau ........................ 34/417 |
| 2012/0170703 | A1 | | 7/2012 | Sprague |

FOREIGN PATENT DOCUMENTS

WO 03/098121 A1 11/2003

OTHER PUBLICATIONS

European Search Report for EP13186942 dated Jul. 22, 2014.

* cited by examiner

*Primary Examiner* — James M Hewitt, II

(74) *Attorney, Agent, or Firm* — Richard J. Coldren; Westinghouse Electric Company LLC

(57) ABSTRACT

A duct connection including a first flange configured to couple with a first duct and a slip fit attached to the first flange. The slip fit has a first portion extending from the first flange substantially perpendicular with respect to the first flange and a second portion extending from the first portion of the slip fit substantially parallel with respect to the first flange. The slip fit and the first flange form a receiving area structured such that a portion of a corresponding flange included on a second duct can slide into the receiving area.

15 Claims, 5 Drawing Sheets

SLIDING DUCT CONNECTION

BACKGROUND

1. Field

The present invention relates generally to ducts and more particularly to a duct connection.

2. Related Art

Many nuclear plants have control rod drive mechanisms. Ducts are routed to the control ride drive mechanisms in order to provide cooling air to the control rod drive mechanisms. Occasionally, the ducts need to be uninstalled to perform maintenance and then reinstalled. For example, ducts routed to the control rod drive mechanisms need to be uninstalled during a refueling outage. The ducts can then be reinstalled after the refueling outage. However, the time to uninstall and reinstall the ducts adds to the downtime of the nuclear plant. Therefore, it is desirable to reduce the time to uninstall and reinstall the ducts.

In some prior designs, toggle clamps were used to couple ducts together. The number of toggle clamps needed to couple ducts together is proportional to the strength of the connection that is needed. As such, some connections which require higher strength will require many toggle clamps. While the time needed to install or uninstall a single toggle clamp is low, the time needed to install or uninstall many toggle clamps is long. Thus, the use of toggle clamps still results in a substantial amount of downtime due to uninstalling and reinstalling ducts.

It is an object of this invention to overcome these difficulties.

SUMMARY

These and other objects are achieved by a duct connection including a first flange configured to couple with a first duct and a slip fit attached to the first flange. The slip fit has a first portion extending from the first flange substantially perpendicular with respect to the first flange and a second portion extending from the first portion of the slip fit substantially parallel with respect to the first flange. The slip fit and the first flange form a receiving area structured such that a portion of a corresponding flange included on a second duct can slide into the receiving area.

These and other objects can also be achieved by a duct assembly including a duct having one or more duct sections coupled in series with each other and one or more duct connections coupled to respective ends of the duct. Each duct connection includes a first flange coupled with the duct and a slip fit attached to the first flange. The slip fit has a first portion extending from the first flange substantially perpendicular with respect to the first flange and a second portion extending from the first portion of the slip fit substantially parallel with respect to the first flange. The slip fit and the first flange form a receiving area structured such that a portion of a corresponding flange included on another duct can slide into the receiving area.

These and other objects can also be achieved by a duct system including a first duct, a second duct, and a first duct connection coupled to an end of the first duct. The first duct connection includes a first flange coupled with an end of the first duct and a first slip fit attached to the first flange. The first slip fit has a first portion extending from the first flange substantially perpendicular with respect to the first flange and a second portion extending from the first portion of the first slip fit substantially parallel with respect to the first flange. The first slip fit and the first flange form a first receiving area structured such that a portion of a second flange coupled with an end of the second duct can slide into the first receiving area.

The second portion of the slip fit can have a shape corresponding to a shape of a portion the first flange. The second portion of the slip fit can have a half flange shape. The duct connection can also include one or more guide members attached to the slip fit, each respective guide member including a first guide portion coupled to the second portion of the slip fit and extending substantially in parallel with respect to the first flange and a second guide portion extending from the first guide portion of each respective guide member and extending away from the first flange at an angle. Each respective guide member can be structured to guide the corresponding flange of the second duct into the receiving area formed by the slip fit and the first flange. The at least one guide member can include a first guide member attached to a first end portion of the slip fit and a second guide member attached to a second end portion of the slip fit. The duct connection can include a second flange configured to be fastened to a corresponding flange included on the first duct with one or more fasteners and a middle portion having a first end coupled to the first flange and a second end coupled to the second flange.

The first duct can include one or more expandable duct sections. Each expandable duct section can be directly coupled with one of the duct connections and can be structured to permit the duct connection to move a limited amount with respect to other duct sections included in the first duct.

The duct system can include a second duct connection coupled to the end of the second duct. The second duct connection can include the second flange coupled with the end of the second duct and a second slip fit attached to the second flange. The second slip fit has a first portion extending from the second flange substantially perpendicular with respect to the second flange and a second portion extending from the first portion of the second slip fit substantially parallel with respect to the second flange. The second slip fit and the second flange form a second receiving area structured such that a portion of the first flange coupled with the end of the first duct can slide into the second receiving area.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

As employed, herein, the statement that two or more parts or components are "coupled" together shall mean that the parts are joined or operate together either directly or through one or more intermediate parts or components. The term "directly coupled" shall mean that the parts are joined or operate together directly without any intermediate parts or components.

Figure 1:
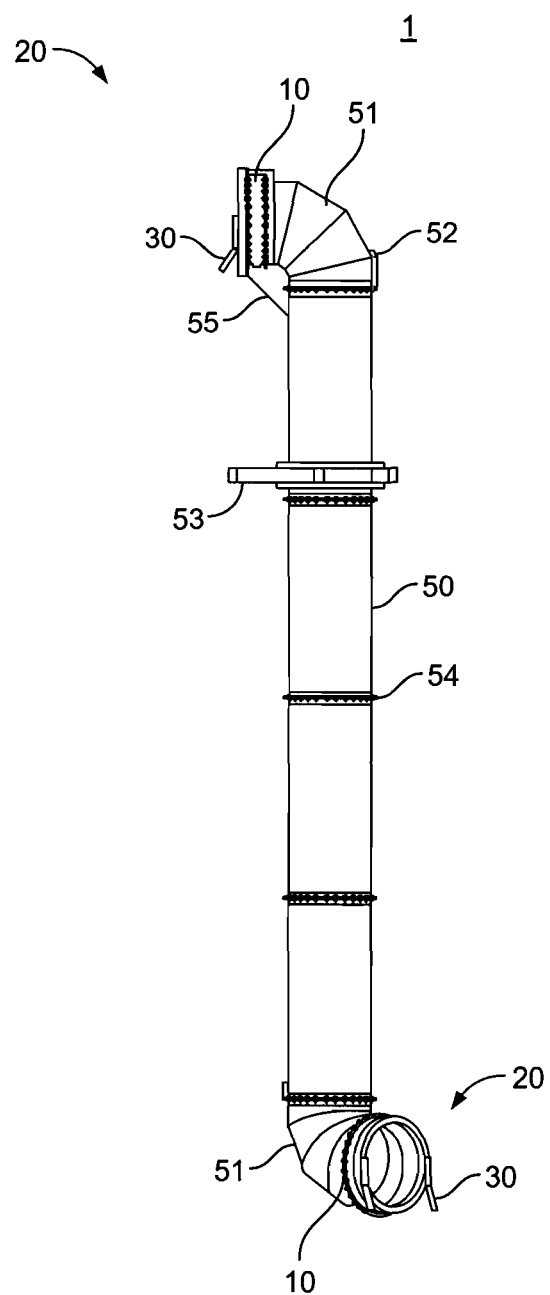
FIG. 1 is a view of a duct assembly according to one of several potential embodiments of the invention.

FIG. 1 is a schematic of a duct assembly 1. The duct assembly 1 includes a series of duct sections 10, 50, and 51 with duct connections 20 coupled at each end. In more detail, the duct assembly 1 includes straight duct sections 50 coupled with each other via flanges 54. Elbow duct sections 51 are coupled with each end of the series of straight duct sections 50. Expandable duct sections 10 are coupled to an end of each elbow duct section 10. Duct connections 20 are coupled to an end of each expandable duct section 10.

The duct assembly 1 is structured to couple with other duct assemblies via the duct connections 20. The other duct assemblies may have a corresponding duct connection section structured similar to duct connections 20. However, duct connections 20 are structured to also couple with other duct assemblies which include a flange, but do not include a corresponding duct connection section.

To couple the duct assembly 1 with other duct sections, the duct assembly 1 is lowered onto other duct sections such that flanges of the other duct sections slide into receiving areas of duct connections 20 thus coupling the duct assembly with other duct sections. The duct connections 20 will be described in more detail hereinafter.

Figure 2:
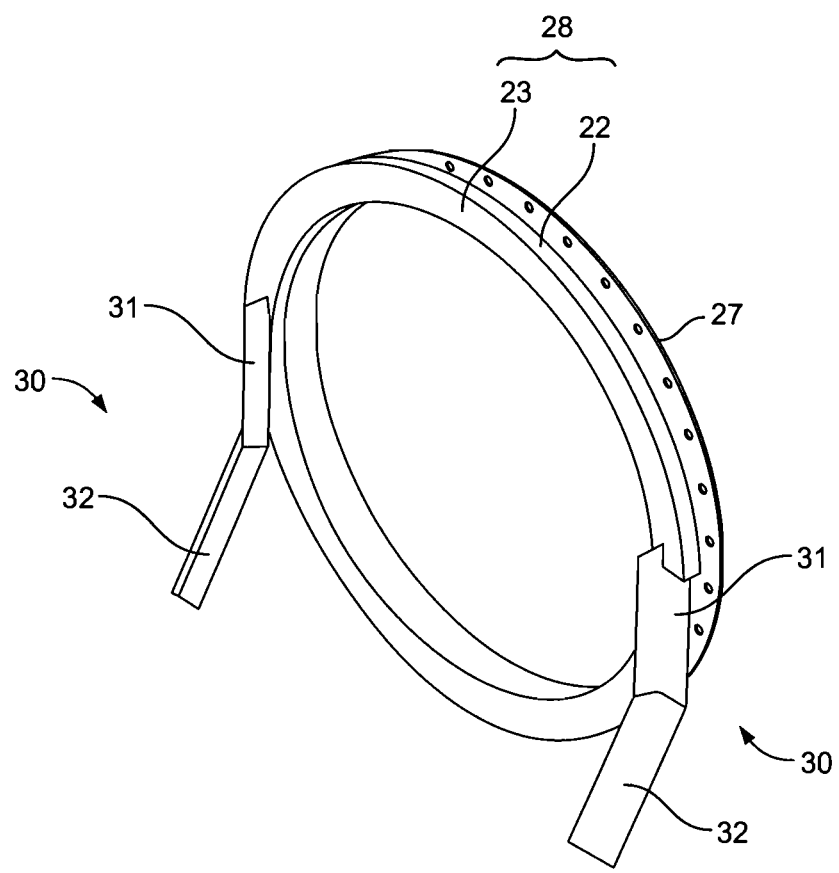
FIG. 2 is an isometric view of a duct connection according to one of several potential embodiments of the invention.
Figure 3:
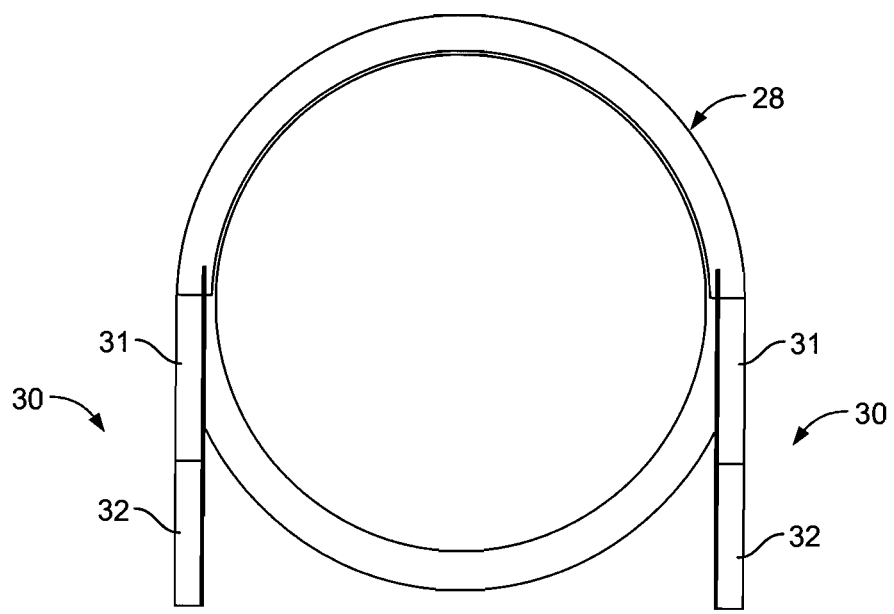
FIG. 3 is a front view of a duct connection according to one of several potential embodiments of the invention.
Figure 4:
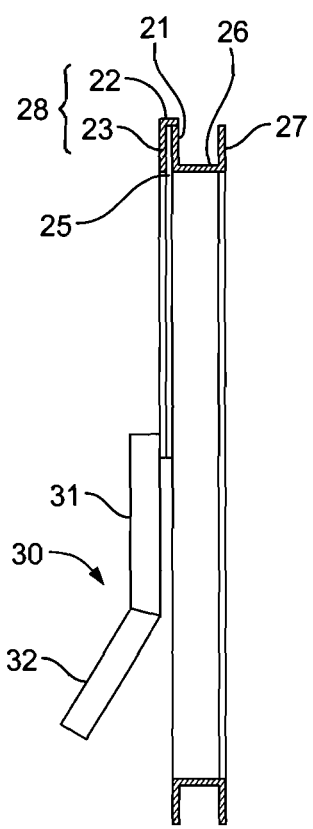
FIG. 4 is a side view of a duct connection according to one of several potential embodiments of the invention.

FIGS. 2-4 illustrate a duct connection 20 in accordance with an exemplary embodiment of the disclosed concept. In the exemplary embodiment of FIGS. 2-4, the duct connection 20 includes a first flange 21 (shown in FIG. 4). A slip fit 28 extends from an end of the first flange 21. The slip fit includes a first portion 22 which extends from the end of the first flange 21 in a direction substantially perpendicular to the first flange 21. The slip fit 28 also includes a second portion 23 that extends from an end of the first portion 22 in a direction which is substantially parallel with the first flange 21.

A receiving area 25 is formed between the slip fit 28 and the first flange 21. The receiving area 25 is structured such that another flange can slide into the receiving area 25.

In the exemplary embodiment of FIGS. 2-4, the second portion 23 of the slip flit 28 has a shape corresponding to a shape of the first flange 21. In FIGS. 2-4, the second portion 23 of the slip fit 28 has a shape of a half flange. The half flange shape has a high structural strength. It is also contemplated that the slip fit 28 can have a shape corresponding to more or less than half of the first flange 21 without departing from the disclosed concept. It is also contemplated that the slip fit 28 can have different shapes which do not directly correspond with the shape of the first flange 21. Additionally, it is contemplated that the slip fit 28 can be segmented to form multiple slip fits distributed across the first flange 21, each corresponding to a portion of the first flange 21.

The duct connection 20 in the exemplary embodiment of FIGS. 2-4 also includes guide members 30. The guide members 30 each include a first guide portion 31 and a second guide portion 32. The first guide portion 31 extends from an end portion of the second section 23 of the slip fit 28 and extends in parallel with the first flange 21. The guide member 30 also includes a second guide portion 32 attached to the first guide portion 31 and extending away from the first flange 21 at an angle. The guide member 30 is structured so as to assist with guiding another flange into the receiving area 25 of the duct connection 30. It is contemplated that any number of guide members 30 may be employed in conjunction with the slip fit 28. It is also contemplated that the guide members 30 may be omitted without departing from the scope of the disclosed concept.

The duct connection 20 also includes a second flange 27. A middle portion 26 of the duct connection 20 is disposed between the first flange 21 and the second flange 27 and is coupled on one end to the first flange 21 and on the other end to the second flange 27. The second flange 27 can be used to couple the duct connection 20 to other duct sections. In some embodiments of the disclosed concept, the duct connection 20 is directly coupled to a duct section, for example and without limitation, by welding the first flange 21 to a duct section or integrally forming the first flange 21 with the duct section. As such, the second flange 27 and middle portion 26 may be omitted from the duct connection 20 without departing from the scope of the disclosed concept.

In the exemplary embodiment of FIGS. 2-4, the duct connection 20 has a circular shape that is suitable for connection with cylindrical duct sections. However, it is contemplated that the shape of the duct connection 20 may be modified without departing from the scope of the disclosed concept. For example and without limitation, the duct connection 20 can have a rectangular shape which is suitable for connection with rectangular duct sections.

Figure 5A:
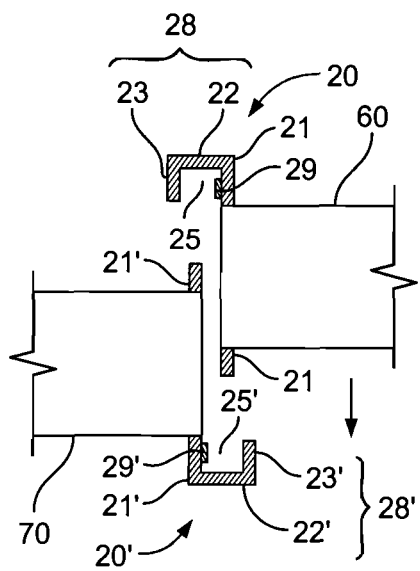
FIGS. 5A and 5B a duct system according to one of several potential embodiments of the invention.
Figure 5B:
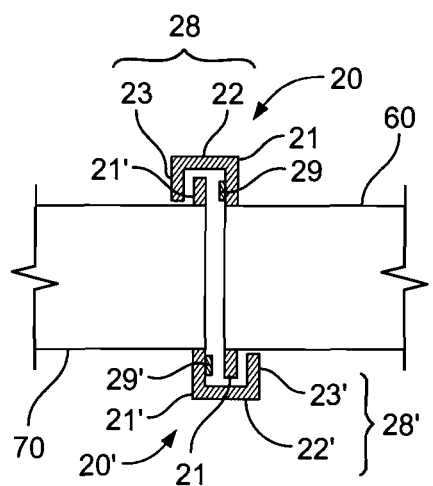

FIGS. 5A and 5B illustrate an operation of coupling duct sections via duct connections 20 and 20'. As illustrated in FIGS. 5A and 5B, a first duct section 60 includes a first duct connection 20 formed at an end of the first duct section 60 and a second duct section 70 includes a second duct connection 20' formed at an end of the second duct section 70. The first duct connection 20 and the second duct connection 20' are structured similar to each other, except that they are oriented opposite of each other. That is, the first duct connection 20 includes a slip fit 28 on an upper half of the first flange 21, while the second duct connection 20' includes a slip fit 28' formed on a lower half of the second flange 21'.

FIG. 5A illustrates the first duct 60 and the second duct 70 before they are coupled with each other. The first duct 60 is located above the second duct 70 and the slip fit 28 of the first duct 60 is oriented such that the opening to the receiving area 25 is facing downward. The second duct 70 is located below the first duct 60 and slip fit 28' of the second duct 70 is oriented such that the receiving area 25' is facing upward. The first flange 21' of the second duct 70 is aligned with the receiving area 25 of the first duct 60. Additionally, the first flange 21 of the first duct 60 is aligned with the receiving area 25' of the second duct 70.

The first duct 60 is then lowered onto the second duct 70 such that the first flanges 21 and 21' slide into the receiving areas 25 and 25'. When the first duct 60 and the second duct 70 slide together, they become coupled in the manner illustrated in FIG. 5B. The first flange 21' of the second duct 70 is received in the receiving area 25 of the first duct 60 and the first flange 21 of the first duct 70 is received in the receiving area 25' of the second duct 70, thus coupling the first duct 60 with the second duct 70.

FIGS. 5A and 5B illustrate spacing between the various components. It is contemplated that when the first duct 60 and the second duct 70 are coupled with each other, there will be gaps between the various components such as, for example, between the first flanges 21 and 21', as it would be difficult to manufacture duct connections 20 and 20' where the first flanges 21 and 21' are in complete contact. As such, some leaks between the first flanges 21 and 21' are expected. However, such leaks can be controlled and accounted for.

In some exemplary embodiments, sealing members 29 and 29' can be included between the first flanges 21 and 21' and receiving spaces 25 and 25', respectively. The sealing members 29 and 29' can reduce leakage due to gaps between the first flanges 21 and 21'. When the first duct 60 and the second duct 70 are connected, the sealing members 29 and 29' form a seal between the first flange 21 of the first duct 60 and the first flange 21' of the second duct 70. The sealing members 29 and 29' can be made of any suitable material to form a seal, such as, for example, an elastic material. In some other embodiments, the sealing members 29 and 29' can be formed between the second sections 23 and 23' of the duct connections 20 and 20' and the receiving spaces 25 and 25', respectively, or on the first flanges 21 and 21'. In further embodiments, a lubricant can be applied in the receiving spaces 25 and 25' before connecting the first duct 60 and the second duct 70. The lubricant assists with both sliding the first flanges 21 and 21' in the receiving spaces 25 and 25' and forming a seal between the first flanges 21 and 21'.

Although in FIGS. 5A and 5B, both the first duct 60 and the second duct 70 include duct connections 20 and 20', it is contemplated that a single duct connection 20 can be used to couple the first duct 60 and the second duct 70. However, using two duct connections 20 and 20' provides a stronger coupling than using a single duct connection 20. Furthermore, one or more additional fasteners may be employed to fasten the first flanges 21 and 21' together to provide a stronger coupling between the ducts 60 and 70. Any suitable type of fastener may be employed to fasten the first flanges 21 and 21' together. One example of a type of fastener that can be employed to fasten the first flanges 21 and 21' together is a toggle clamp. However, in many applications, the duct connection 20 will provide a sufficiently strong coupling. Coupling and uncoupling the ducts 60 and 70 via the duct connections 20 or 20' allows the ducts 60 and 70 to be coupled and uncoupled more quickly than if the ducts 60 and 70 were to be coupled with fasteners as it takes time to individually attach or detach each fastener. Additionally, even if fasteners are used in conjunction with the duct connections 20 and 20', the number of fasteners needed to provide a suitably strong connection is less than if fasteners were used without the duct connections 20 and 20'. Therefore, using the duct connections 20 and 20' still reduces the time needed to couple or uncouple the ducts 60 and 70.

Additionally, although the exemplary embodiment illustrated in FIGS. 5A and 5B does not include guide member 30, it is contemplated that the exemplary embodiment of FIG. 5A and FIG. 5B may be modified to include guide members 30 such as those shown and described with respect to FIGS. 2-4. The guide members 30 operate to guide the first flanges 21 and 21' into the receiving areas 25 and 25' which allows for more tolerance in misalignment of the first flanges 21 and 21' and receiving areas 25 and 25' when coupling the ducts 60 and 70.

Referring back to FIG. 1, the expandable duct sections 10 allow the duct connections 20 to move a limited amount in any direction. Including the expandable duct sections 10 between the duct connections 20 and the elbow sections 51 helps to compensate for misalignment between the duct connections 20 and other ducts when coupling the duct assembly 1 with other ducts. Additionally, trying to couple or uncouple the duct assembly 1 and other ducts when the duct assembly 1 and other ducts are misaligned can cause the duct assembly 1 and other ducts to become stuck before fully coupling or uncoupling. The expandable duct sections 10 allow a limited amount of movement of the duct connections 20 which alleviates concerns about the duct assembly 1 becoming stuck during coupling or uncoupling. It is contemplated that the expandable duct sections 10 can be incorporated into or used in conjunction with any of the exemplary embodiments described herein without departing from the scope of the disclosed concept.

Referring to FIG. 1, the duct assembly 1 also includes one or more wire connection points 52 and a support member 53. The wire connection points 52 are points where a wire can be connected. The wire can be used to assist with lifting or lowering the duct assembly 1. The duct assembly 1 also includes a support member 53. The support member 53 is attached to one of the straight duct sections 50. When the duct assembly 1 is installed in a facility, the support member 53 abuts against a wall to provide additional structural support to the duct assembly 1.

Continuing to refer to FIG. 1, the duct assembly also includes a guide pole 55. A technician can grab the guide pole 55 and use it to assist with aligning the duct assembly 1 when coupling or uncoupling the duct assembly 1 and other duct section.

The duct assembly 1 of FIG. 1 is structured as a downcomer that allows for coupling between other ducts which are at different elevations. However, duct connections 20 are not limited to use in downcomer type duct assemblies. Rather, it is contemplated that duct connections 20 may be employed in a variety of different types of duct assemblies.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A duct connection comprising:
   a first flange;
   a second flange;
   a middle portion having a first end coupled to the first flange and a second end coupled to the second flange;
   an expandable duct section having a first end directly coupled to the second flange and a second end configured to couple with a first duct; and
   a slip fit attached to the first flange, the slip fit having a first portion and a second portion, wherein, in cross-section, the first portion extends from the first flange substantially perpendicular with respect to the first flange and the second portion extends from the first portion of the slip fit substantially parallel with respect to the first flange,
   wherein the slip fit and the first flange form a receiving area structured such that a portion of a corresponding flange included on a second duct can slide into the receiving area,
   wherein the expandable duct section is structured to expand to permit the slip fit to move a limited amount in any direction, and
   wherein, in cross-section, the first flange extends from the first end of the middle portion in a direction substantially perpendicular with respect to the middle portion, the second flange extends from the second end of the middle portion in the direction substantially perpendicular to the middle portion, and the first and second flanges are substantially parallel with each other.

2. The duct connection of claim 1, wherein the second portion of the slip fit has a shape corresponding to a shape of a portion the first flange.

3. The duct connection of claim 2, wherein the second portion of the slip fit has a half flange shape.

4. The duct connection of claim 1, further comprising:
one or more guide members attached to the slip fit, each respective guide member including a first guide portion coupled to the second portion of the slip fit and extending substantially in parallel with respect to the first flange and a second guide portion extending from the first guide portion of each respective guide member and extending away from the first flange at an angle,
wherein each respective guide member is structured to guide the corresponding flange of the second duct into the receiving area formed by the slip fit and the first flange.

5. The duct connection of claim 4, wherein the at least one guide member includes a first guide member attached to a first end portion of the slip fit and a second guide member attached to a second end portion of the slip fit.

6. The duct connection of claim 1, further comprising:
a sealing member formed between the receiving area and at least one of the first flange and the second portion of the slip fit.

7. A duct assembly comprising:
a duct including one or more duct sections coupled in series with each other; and
one or more duct connections coupled to respective ends of the duct, each duct connection comprising:
a first flange;
a second flange;
a middle portion having a first end coupled to the first flange and a second end coupled to the second flange;
a slip fit attached to the first flange, the slip fit having a first portion and a second portion, wherein, in cross-section, the first portion extends from the first flange substantially perpendicular with respect to the first flange and the second portion extends from the first portion of the slip fit substantially parallel with respect to the first flange,
wherein the slip fit and the first flange form a receiving area structured such that a portion of a corresponding flange included on another duct section can slide into the receiving area,
wherein the duct includes one or more expandable duct sections, wherein each expandable duct section is directly coupled with the second flange of one of the duct connections and is structured to expand to permit the duct connection to move a limited amount with respect to other duct sections included in the duct, and
wherein, in cross-section, the first flange extends from the first end of the middle portion in a direction substantially perpendicular with respect to the middle portion, the second flange extends from the second end of the middle portion in the direction substantially perpendicular to the middle portion, and the first and second flanges are substantially parallel with each other.

8. The duct assembly of claim 7, wherein the second portion of the slip fit has a shape corresponding to a shape of a portion the first flange.

9. The duct assembly of claim 8, wherein the second portion of the slip fit has a half flange shape.

10. The duct assembly of claim 7, further comprising:
one or more guide members attached to the slip fit, each respective guide member including a first guide portion coupled to the second portion of the slip fit and extending substantially in parallel with respect to the first flange and a second guide portion extending from the first guide portion of each respective guide member and extending away from the first flange at an angle,
wherein each respective guide member is structured to guide the corresponding flange of the second duct into the receiving area formed by the slip fit and the first flange.

11. The duct assembly of claim 10, wherein the at least one guide member includes a first guide member attached to a first end portion of the slip fit and a second guide member attached to a second end portion of the slip fit.

12. The duct assembly of claim 7, wherein the duct has a first and a second end and the one or more duct connections include a first duct connection coupled to the first end of the duct and a second duct connection coupled to the second end of the duct.

13. The duct assembly of claim 7, wherein the one or more duct connections each include a sealing member formed between the receiving area and at least one of the first flange and the second portion of the slip fit.

14. A duct system comprising:
a first duct;
a second duct; and
a first duct connection coupled to an end of the first duct, the first duct connection comprising:
a first flange;
a second flange;
a middle portion having a first end coupled to the first flange and a second end coupled to the second flange;
an expandable duct section having a first end directly coupled to the second flange; and
a first slip fit attached to the first flange, the first slip fit having a first portion and a second portion, wherein, in cross-section, the first portion extends from the first flange substantially perpendicular with respect to the first flange and the second portion extends from the first portion of the first slip fit substantially parallel with respect to the first flange,
wherein the first slip fit and the first flange form a first receiving area structured such that a portion of a corresponding flange coupled with an end of the second duct can slide into the first receiving area,
wherein the expandable duct section is structured to expand to permit the slip fit to move a limited amount in any direction, and
wherein, in cross-section, the first flange extends from the first end of the middle portion in a direction substantially perpendicular with respect to the middle portion, the second flange extends from the second end of the middle portion in the direction substantially perpendicular to the middle portion, and the first and second flanges are substantially parallel with each other.

15. The duct system of claim 14, wherein the first duct connection includes a first sealing member formed between the first receiving area and at least one of the first flange and the second portion of the first slip fit,
wherein the sealing member is structured to form a seal between the first flange and the second flange when the corresponding flange is slid into the first receiving area.

* * * * *